(12) United States Patent
Kriss

(10) Patent No.: US 7,079,703 B2
(45) Date of Patent: Jul. 18, 2006

(54) JPEG ARTIFACT REMOVAL

(75) Inventor: Michael A. Kriss, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 709 days.

(21) Appl. No.: 10/278,206

(22) Filed: Oct. 21, 2002

(65) Prior Publication Data

US 2004/0076338 A1    Apr. 22, 2004

(51) Int. Cl.
*K06K 9/40* (2006.01)
(52) U.S. Cl. ............ 382/275; 382/260; 382/274; 382/278; 358/3.26; 358/3.27; 358/463
(58) Field of Classification Search ............ 382/235, 382/260, 274, 275; 358/3.26, 3.27, 463
See application file for complete search history.

(56) References Cited

U.S. PATENT DOCUMENTS 5,495,538 A    2/1996    Fan

FOREIGN PATENT DOCUMENTS

| EP | 0716 548 A2 | 6/1996 |
| EP | 0716 548 A3 | 12/1998 |
| EP | 1073 014 A2 | 1/2001 |
| EP | 0716 548 B1 | 10/2001 |
| EP | 1070 014 A3 | 2/2002 |
| JP | 0614 1182 A | 5/1994 |

*Primary Examiner*—Samir Ahmed
*Assistant Examiner*—Yosef Kassa
(74) *Attorney, Agent, or Firm*—David C. Ripma

(57) ABSTRACT

A system and methodology for removing JPEG-compression artifacts from color images, wherein a first-stage examination of the image takes place to determine, in accordance with several approaches, whether artifact removal is appropriate for the image. Following such examination and characterization, when an image is determined to be a candidate for artifact removal, pixel blocks in the image are examined so that they can be characterized as uniform, busy or transitional, and from these characterizations, appropriate filters, or no filter at all, are employed to prepare such pixels for insertion into a final artifact-removed output color image.

13 Claims, 3 Drawing Sheets

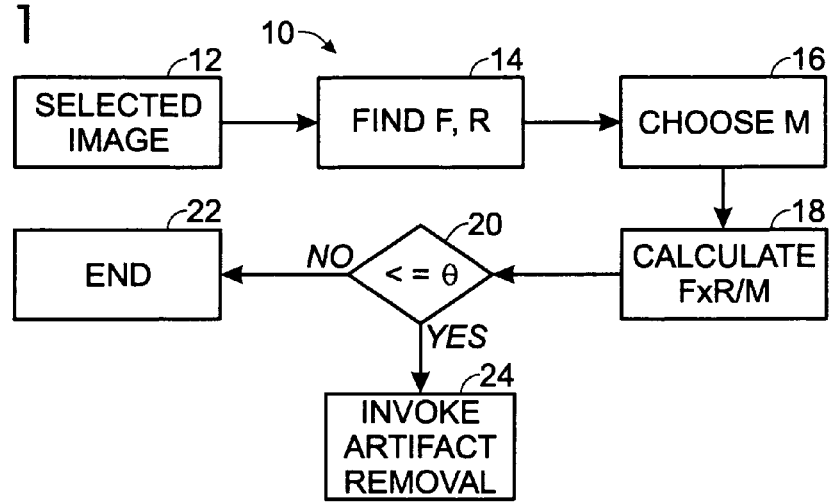
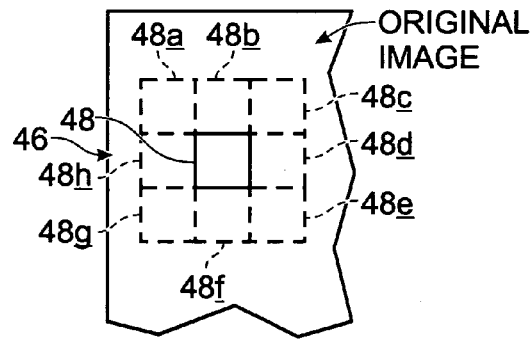
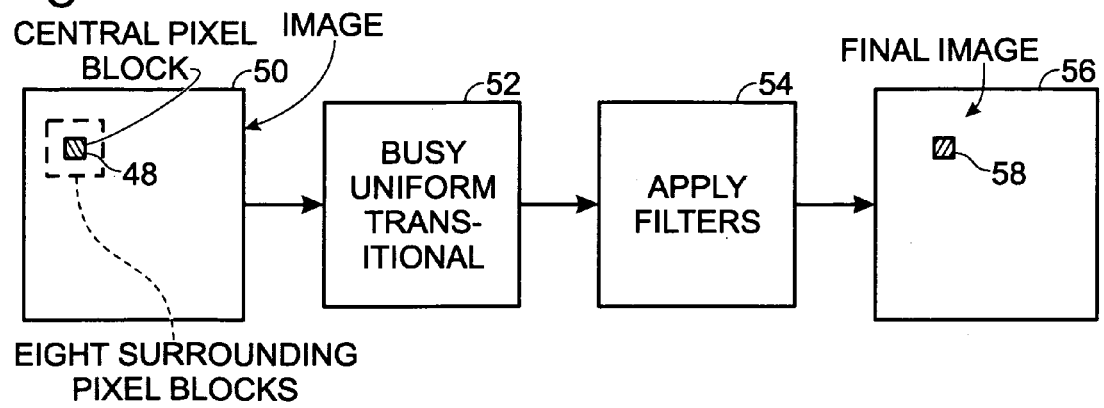

JPEG ARTIFACT REMOVAL

This invention relates to JPEG-compression artifact removal from a color image. In particular it relates to a system and a method for accomplishing such removal on the basis of an image evaluation which looks at (a) image file size, pixel count and intended magnification as indicators regarding whether artifact removal should be performed, and thereafter, if removal is to be performed, at (b) selected regional image characteristics including the categories of uniformity, transitional quality (like what occurs at edges), and general business.

The invention especially responds to a current and rising interest in enabling users to perform artifact removal with respect to images which they would like to print in a manner which offers a relatively simple, yet quite sophisticated and effective artifact removal approach.

The system and method of the invention are described and illustrated herein, in text and drawings, in several embodiments and manners of practicing, including preferred embodiments and best-mode ways of practicing.

DESCRIPTION OF THE DRAWINGS

FIG. 1 is a simplified block/schematic diagram illustrating that part of the present invention which involves making an initial determination whether a selected JPEG-compressed color image should be or should not be a candidate for artifact removal.

FIGS. 3–5, inclusive, aid in describing the artifact-removal algorithm employed in the arrangement pictured in FIG. 2, with FIG. 3 illustrating a condition of variance in an image, FIG. 4 showing a logic map involving the same image, and FIG. 5 picturing the MTF response of an employed enhancement filter.

FIG. 6 is a fragmentary illustration of a portion of a JPEG-compressed color image which has been selected for artifact removal, with several 8-by-8pixel blocks in the image illustrated both in solid lines (one pixel block) and in dashed lines (eight pixel blocks) in this figure.

FIG. 7 is a simplified block/schematic diagram illustrating a modified system and manner of practicing the present invention which is discussed herein in the context of what is shown in FIG. 3.

FIG. 8 diagrams the architectural logic of an algorithm which performs in accordance with the system and methodology of FIG. 4.

DETAILED DESCRIPTION OF THE INVENTION

1. Technical Background

Figure 2:
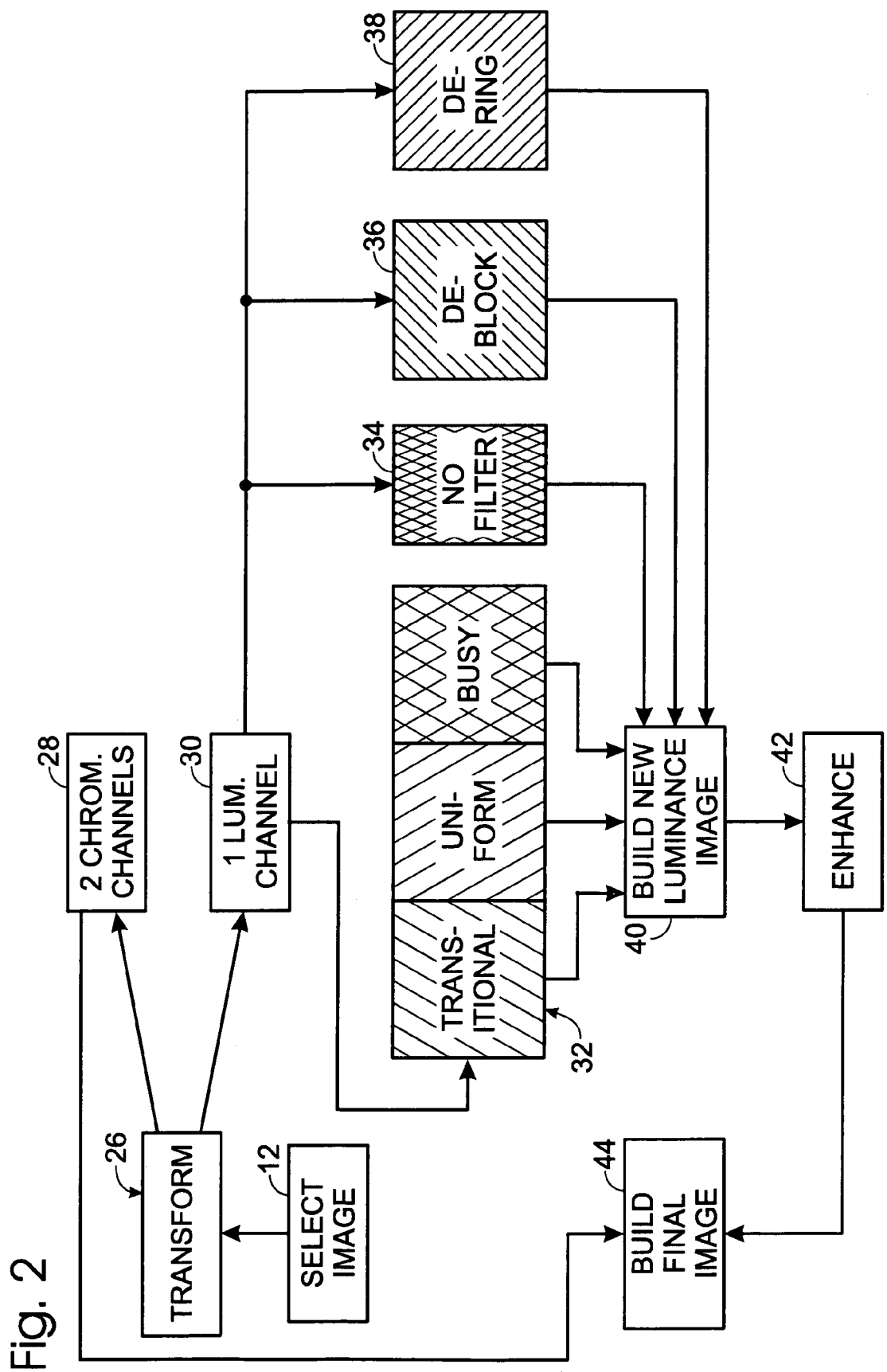
FIG. 2 is a simplified block/schematic diagram generally illustrating a preferred system and methodology for implementing artifact removal based upon the Yes/No determination which is performed as illustrated in FIG. 1.

It is well known that ringing and blocking artifacts are consequential image components that result from traditionally employed JPEG compression algorithms. With respect to looking at and thinking about a color image as one that is made up of a plurality of 8×8 blocks of pixels, the format in which JPEG performs its compression, when high compression is required, the traditional JPEG algorithm greatly quantizes the information that is contained inside such basic 8×8 blocks. In many instances, the artifact-creating effects of this activity are extremely visible in computer-based color images, and there is a substantial desire to provide simple and elegant solutions, which will effectively remove such artifact effects from visibility.

2. The Invention Generally

The present invention offers a solution to artifact removal, in the setting discussed generally above, by implementing two novel stages of activity, the first of which involves performing an assessment with respect to a selected JPEG-compressed color image regarding whether or not to invoke artifact removal, and the second of which comes to play when the decision to invoke artifact removal is positive. This second stage, or phase, involves examining the luminance channel of an image to characterize different 8×8 pixel blocks with regard to certain definitive characterizations which reside in three categories. These categories are referred to herein as uniform, transitional, and busy. The uniform characterization is one which is applied where, in terms of pixel variance, a block is seen to possess substantial pixel uniformity within itself and with respect to neighboring pixel blocks. The transitional characterization is one which is employed particularly at the edge of an image where there is a region containing pixel blocks that have higher variance and an adjacent region containing pixel blocks that have lower variance associated with a uniform area. This same (transitional) characterization can also apply to image-internal regional transitions which are somewhat like image edge transitions. The busy characterization involves pixel blocks, and neighbors of these blocks, wherein there is very high degree of pixel variance complexity, in which kind of a visual field it is unlikely that even fairly pronounced JPEG ringing and blocking artifacts will be visually detected.

When a decision has been made to perform artifact removal, on the basis of an examination of an image from any one of three different specific manners proposed to herein for performing such an assessment (described below), the single luminance channel of the image is effectively separated from the two chrominance channels so as to enable the creation of three kinds of luminance-based images from which a final artifact-removed output image will be created. One of these luminance-based images is exactly the unfiltered luminance-channel image of the original image per se. Another is one that has been created by applying a de-blocking filter to the original luminance channel image, the details of which filter will be explained shortly below. The third type of luminance-based image is one that is created by applying a de-ringing filter to the original luminance-channel image, and this filter will be described in greater detail below also.

In accordance with a preferred manner of practicing the invention, these three kinds of luminance-based images are generated, and also generated is what is referred to herein as a variance map which describes the character of the overall luminance-based image in terms of the three characteristics mentioned above, namely, the characteristics given the names uniform, transitional and busy. It should be understood that these characterizations are singular with respect to each pixel block. In other words, no pixel block is characterized in two of these ways.

With the variance map created, and the three kinds of luminance-based processed images readied, what is referred to herein as a logic map is employed to define precisely how a final artifact-removed image will be constructed. For assembly of such a final image, each pixel block is examined for its characterization as being either uniform, transitional or busy, and depending upon this characterization, its positional counterpart in one of the three luminance-based images is employed directly in the final image. Very specifically, if a pixel block is determined to have the characteristic called busy, the positionally-matching counterpart pixel block which exists in the unfiltered original luminance-based image is employed in the final image. If, however, such a pixel block is characterized as uniform, then its positional counterpart in the de-blocking luminance image is selected for incorporation into the final image. Finally, if a pixel block's characterization is determined to be transitional, then its positional counterpart in the de-ringing luminance-based image is selected for use in the final image.

The preferred manner of practicing the invention involves the full creation of the three luminance-based images mentioned above, and the full characterization of each 8×8 pixel block for the entire image as being uniform, transitional or busy, before any final image-assembly takes place. On route to such a final assembly, the chosen, processed luminance-based image for use in the final image is re-combined with the counterpart two chrominance channels which were separated at the time that the original full image was first investigated, and also along this route, certain image enhancements, as will be further described, may be employed.

An alternative manner of practicing the artifact-removal portion of the invention, which manner is practiced by a modified form of the invention, analysis involves a chain of pixel-block by pixel-block serial activity. In this approach, each 8×8 pixel block is characterized as either being uniform, transitional, or busy, and depending upon this characterization is then filtered or not filtered, along the lines just mentioned above, and then directly placed into a location wherein the final output artifact-removed image is to be created. In other words, in this approach toward practicing the invention, the overall and full image analyses and characterizations described earlier are not performed before final output-image assembly begins.

3. The FIGS. 1 and 2 Embodiment

With reference now to FIG. 1 in the drawings, here there is shown, in block form and schematically, the preferred system and method of practicing the present invention. This system and related methodology are designated generally at 10 in FIG. 1. Generally speaking now, what is shown in FIG. 1 will be, for the sake of convenience and simplicity, described mostly in systemic terms.

Within system 10, a block 12 represents a JPEG-compressed color image which has been selected for examination, and for possible artifact removal. A block 14, which is operationally downstream from block 12 in FIG. 1, represents a structure and an activity for determining both the file size (F) and the pixel count (R) of image 12 in kilobytes. A block 16 in FIG. 1 represents structure and methodology for selecting a final-image magnification factor, and a block 18 represents structure and methodology for calculating the end result produced by multiplying the file size by the pixel count, and dividing this by the selected magnification number. Further shown in FIG. 1 are a Yes/No determination block 20 which represents structure and methodology essentially for asking the question whether the calculation produced by block 18 is equal to or less than a predetermined threshold value (θ), and a block 22 which brings the activity to an end if the answer to the question raised in block 20 is No. Also illustrated is a block 24 which represents structure and methodology for implementing artifact removal if the answer to the question asked by block 20 is Yes. The logical flow of activity pictured in FIG. 1 is clearly illustrated by the connecting arrow-headed lines.

Thus FIG. 1 illustrates the preferred manner of assessing a full JPEG-compressed color image to determine whether or not artifact removal should be invoked. While different threshold values (θ) can be selected, a value which has been found, by experience with the invention, to be a very good value for this number is 100,000.

As was mentioned earlier, while what is specifically shown in FIG. 1 represents a preferred manner of characterizing an image as being or not being an appropriate candidate for artifact removal, two other specifically useful approaches are also contemplated by the invention. One of these approaches is simply based upon deciding artifact-removal candidacy based purely upon file size. Here, an appropriate file-size number in kilobytes has been found to be about 300,000. The other alternative manner of assessing an original image for candidacy involves determining both file size and pixel count in kilo pixels, and by then multiplying these two together to produce a product which is then compared with another kind of threshold value. Here, an appropriate value has been found to be about 500,000.

No matter which of these techniques is employed to qualify an image as being or not being a candidate for artifact removal, when an image is determined to be appropriate for artifact removal, then the second phase of the invention, namely specific artifact removal activity, is performed.

Turning attention now to FIG. 2 in the drawings, this figure illustrates the preferred structure and methodology proposed by the present invention for performing artifact removal. Included as shown in the block/schematic diagram of FIG. 2 are a Select Image block 12 (which is like block 12 pictured in FIG. 1), a Transform block 26, a 2Chrominance Channel block 28, a 1-Luminance channel block 30, a multi-function block 32 which involves image pixel-block characterizations in accordance with the terms uniform, transitional and busy, a No Filter block 34, a De-Blocking Filter block 36, a De-Ringing filter block 38, a Build New Luminance Image block 40, an Enhance block 42, and finally a Build Final Image block 44.

Associated preferably with, and effectively disposed operatively within, Deblocking filter block 36, is a low-pass filter which is based upon a Gaussian spread function:

Kernel=e EXP−$(x^2+y^2)/2\sigma^2$, where σ=1 in terms of pixels. The filter is multiplied by 1024, and rounded to the nearest integer to give:

$$\text{kernel} = \begin{bmatrix} 0 & 2 & 7 & 11 & 7 & 2 & 0 \\ 2 & 19 & 84 & 139 & 84 & 19 & 2 \\ 7 & 84 & 377 & 621 & 377 & 84 & 7 \\ 11 & 139 & 621 & 1024 & 621 & 139 & 11 \\ 7 & 84 & 377 & 621 & 377 & 84 & 7 \\ 2 & 19 & 84 & 139 & 84 & 19 & 2 \\ 0 & 2 & 7 & 11 & 7 & 2 & 0 \end{bmatrix} \Big/ 6436$$

Associated preferably with, and effectively disposed operatively within, De-ringing filer block 38, is another low-pass filter, as follows:

$$\text{kernel} = \begin{bmatrix} 1 & 3 & 1 \\ 3 & 6 & 3 \\ 1 & 3 & 1 \end{bmatrix} \Big/ 22$$

Other very specific details about the preferred manner of implementing artifact removal are described below. At this point, however, the operational flow of artifact removal in accordance with the system and methodology represented in FIG. 2 can be expressed generally in the following manner.

An image which has been selected for invocation of artifact removal in accordance, for example, with what is shown in FIG. 1 herein, is transformed in block 26 which effectively separates the whole image into its two constituent chrominance channels (block 28) and into its single luminance channel (block 30). Blocks 34, 36, 38 effectively act upon the original luminance channel to make available to block 40 three different luminance-based images which were mentioned briefly earlier herein. Block 34 simply passes an unfiltered version of the luminance-channel image directly to block 40. De-blocking filter block 36 applies the above described low-pass de-blocking filter to the original luminance-channel image to create, and to make available to block 40, what has been referred to herein as a de-blocking luminance-based image. Similarly, the de-ringing low-pass filter which is operationally present in block 38 acts upon the original luminance channel image to create, and to present to block 40, a de-ringing luminance-based image.

The luminance-channel image present and made available by block 30 is also made available to block 32 wherein, on a pixel-block-by-pixel-block basis, the luminance-channel image is characterized with respect to the characteristic designators called uniform, transitional and busy. One will note that block 32 is divided into three sections, each of which bears a different character of area shading. This shading selves to distinguish these three characteristics, and to relate these three characteristics to activities which take place respectively with regard to blocks 34, 36, 38. One will see that the surface areas of blocks 34, 36, 38 are respectively area-shaded in manners which give a visual direct relationship between what is performed in these three blocks and what takes place in the characterization areas respectively in block 32. Pixel blocks which are identified as uniform, busy and transitional, respectively, are appropriately made available to block 40.

The earlier mentioned logic map which describes the architecture of final assembly to produce an artifact-cleared output image is prepared on the basis of the three characterizations which are performed on the whole luminance-based image within block 32. Effectively, this logic map describes, on a pixel-block-by-pixel-block basis, just which pixel blocks in the final image will be drawn from one of the original luminance-based image, the de-blocking luminance-based image, and the de-ringing luminance-based image.

From this information, block 40 builds a precursor to the final output image, which precursor is referred to herein as a processed luminance image.

From block 40 the processed luminance image is furnished to enhancement block 42 which produces and supplies to block 44 what is referred to herein as an enhanced processed luminance image. Considering what takes place within block 42 to perform enhancement, based on the size of the image and the final print size (say 4-inches in the short dimension) a suitable enhancement filter and kernel is calculated based on well known criteria. Based on the final print size, the printer dpi and the pixel resolution, a 3×3, 5×5 or 7×7 is picked for enhancement. A fixed enhancement MTF is used (in the plane of the final print) and based on the kernel size, the appropriate number of frequency samples is taken form 0 to 6 cycles/mm; it is assumed that most observers will not see enhancement above 6-cycles/mm on the print. This results in first a one-dimensional FIR, and then using eight-way symmetry the two-dimensional FIR filter is generated. Note, as cited above, if avgvar (the average variance of the whole image) is greater than 600 the "boost factor" (roughly the boost factor is the gain in excess of unity at the peak of the frequency response) is reduced from 1.0 to 0.5 to insure a natural look. The kernal is then applied to the image resulting in an enhanced, processed luminance-channel image. The processed luminance-channel image is then recombined with the two chrominance channels to form the final image.

The enhanced processed luminance image which is fed to block 44 is therein combined with the two previously separated chrominance channels (block 28) to form the final artifact-purged output color image.

Presented now immediately below is a full description of the algorithm which is implemented in the practice or the system and methodology illustrated so far with regard to FIGS. 1 and 2.

4. The FIG. 2 Artifact-Removal Algorithm

JPED ARTIFACE REMOVAL PROGRAM $Line=1
  1

The TimeUsed[ ] calls are used to measure how long the processing takes. They have no impact on the program.
firsttime=TimeUsed[ ]
  5198.22
<<ImageProcessing'
<<Statistics'

Reading the Image and Determining its Dimensions

Read in the image file in raw, layered format and break it up into luminance and chrominance channels—it will assume an aspect ratio of 4:3 with the long dimension along the "j" axis and the short dimension along the "" direction.
image=ReadList[
  "Macintosh HD:Desktop Folder:
    Blocking_Removal:Women.raw",
  Byte];
l=Length[image]/3
  307200

The next three steps separate the luminance and chrominance channels.
lumimage=Take[image, 1];
aimage=Take[image, {1+1, 2*1}];
bimage=Take[image, −1];

This calculates the size of the image, hsize being the j direction and isize being the i direction assuming a 4:3 aspect ratio.
hsize=Sqrt[4*1/3]
  640
lsize=Sqrt[3*1/4]
  480

The next three steps form the three images images.
lumimage=Partition[lumimage, hsize];
aimage=Partition[aimage, hsize];
bimage=Partition[bimage, hsize];

d is a vector that stores the dimensions of the image.
d=Dimensions[lumimage]
  {480, 640}

Orig is a copy of the luminance channel and keeps it safe from corruption.
orig=lumimage;

bs deterermines the block size used to get rid of the JPEG ringing and is normall set to 8.

bs=8

8

The next step calculates the number of blocks on an edge that need to be looked at. The total number of blocks is nblocks*ynblocks. For a 640×480 image the number of blocks is 80×60.

nblocks=d[[2]]/bs

80 ynblocks=d[[1]]/bs

60

Creating the Filters to be Used in Eliminating Blocking and Ringing Artifacts Deringingfilter is used to smooth the bs×bs block if it is is processed for artifact removal. The center weight helps blend the bs×bs block and the surrounding blocks. This filter is used to reduce ringing artifacts to below a level where they are obbious to an observer after enhancement.

deringingfilter=

{{1, 3, 1}, {3, 6, 3}, {1, 3, 1}};

The nonnalization is uesed to get the correct answer after the integer multiplication is used to speed up the calculations.

norm=

Sum[Flatten[deringingfilter][[i]],

{i, 1, 9}]

22

MatrixForm[deringingfilter]

$$\begin{pmatrix} 1 & 3 & 1 \\ 3 & 6 & 3 \\ 1 & 3 & 1 \end{pmatrix}$$

We will now calculate the de-blocking filter which is a (2*flsize+1) array based on a Gaussian kernel with a sigma of one pixel. fsize=3 for a 7×7 kernel.

sigma=1

1 fsize=3

3 deblockingfilter=

N[

Table[

Exp[-((i)^2+(j)^2)/

(2*sigma^2)],

{i, -fsize, fsize},

{j, -fsize, fsize}]];

newfilter is turned into an integer kernel by multiplying by 1024. The subsequent normilization will recover the exact values after convolution.

deblockingfilter=

Round[1024*deblockingfilter];

MatrixForm[deblockingfilter]

$$\begin{pmatrix} 0 & 2 & 7 & 11 & 7 & 2 & 0 \\ 2 & 19 & 84 & 139 & 84 & 19 & 2 \\ 7 & 84 & 377 & 621 & 377 & 84 & 7 \\ 11 & 139 & 621 & 1024 & 621 & 139 & 11 \\ 7 & 84 & 337 & 621 & 377 & 84 & 7 \\ 2 & 19 & 84 & 139 & 84 & 19 & 2 \\ 0 & 2 & 7 & 11 & 7 & 2 & 0 \end{pmatrix}$$

newnorm=Sum[deblockingfilter[[i, j]],

{i, 1, 2*fsize+1},

{j, 1, 2*fsize+1}]

6436 t1=TimeUsed[ ]

5200.95

Creating the Variance Map for the Image

Two arrays are now created to hold the variance of the image blocks, varmap and the other is the logicmap which defines which is to be done in forming the final image.

varmap=Table[0, {ynblocks},

{nblocks}];

For[i=1, i<=ynblocks, i++,

For[j=1, j<=nblocks, j++, b1=Take[lumimage,

{(i-1)*bs+1, (i-1)*bs+bs},

{(j-1)*bs+1, (j-1)*bs+bs}];

varmap[[i, j]]=

Round[Variance[Flatten[b1]]];

]];

Print["Time used=", (TimeUsed[ ]-t1)/60];

Time used=0.169722

FIG. 3 shows an "image" of the variance of the 8×8 blocks. White is high variance and black is low variance.

Show [DensityGraphics[varmap,

Mesh Æ False, AspectRatio Æ 0.75]];

avgvar is the average value of the varinace of the 8×8 block for the entire image. It has been found by experiment that for most images if avgvar is under 600 a boost of 1.0 can be used in the enhancement,but if avgvar is geater than 600 it is best to lower the boost to 0.5.

Determining the Boost to be Used During Spatial Enhancement avgvar=N[mean[Flatten[varmap]]]

285.809 thresh1 set the cirteria for the variance of a uniform area. If the average variance of the 3×3 array of variances is equal to or less than thresh 1, then the central block is assumed to be in a uniform area and it will be filtered by the de-blocking filter.

thresh1=64;

b is the boost value used in the spatial enhancement at the end of the process. b is set to "0" to establish it as a variablem, but will be changed. Two values of b are used, b=1 for images that are not too busy (avgvar≦600) and b=0.5 for busy images (avgvar>600).

b=0;
   bthresh=600;
If[avgvar≧bthresh, b=0.5, b=1];
b 1
time2=TimeUsed[ ]
   5210.73

Creating the Logic Map

The next set of operations fonn the logicmap that is used to determine how to combine the original image, the deblocking image and the de-ringing image into a final image that has removed most of the blocking and reduced the ringing to below visual levles. The first stedp is to form the logicmap output array, which as the same dimensions as the varmap array. There is a one-to-one mapping of the elements of the varmap to the logic map. It is very important to follow the logical steps below, any change in the sequence will lead to wrong results. The first step is to take a 3×3 array of the varmap values and calculate its average value which is called "uniform". Next, the standard deviation of this 3×3 block is calculated and is called "stdvar". Note that all values are Rounded (Round[ ]) to the nearest integers in all operations. The next few steps calculate the average of the three top, bottom, left, right and four corners values of the varmap values in the 3×3 array; they are called toptest, bottomtest, righttest, lefttest, corner1, corner2, corner3 and corner4. Now the testing can start. The first test is to see if uniform is less than or equal to thresh 1. If it is, then the central position of the 3×3 array is assumed to be in a uniform region and the logicmap is set to "255" to indicated that the deblocking image should be used for this 8×8 block. If this test is false, then toptest, bottomtest, righttest, lefttest, corner1, corner2, corner3, and corner 4 are tested to see if they are less than or equal to thresh1; if any one of them pass the test, then the central logicmap location is again set to "255". If the last test is false, then each of the eight values of varmap around the central value of varmap is tested to see is any one of them are less than or equal to thresh1; if at least one is equal to or less than thresh1 and the central varmap value is greater than thresh1, the central location on the logicmap is set to "128" which means that this block in the image will be replaced with the corresponding block in the deringing image. If this test is false, than the central value of the varmap is compared to the standard deviation, stdvar, of the 3×3 array (at which it is in the center) to see if this is a busy area. This is done by taking the aboslute value of the central varmap minus the averange value , uniform, and asking if this term is less than ore equal to two standard deviations of the 3×3 varmap array. If this condition is met, then it is assumed that we are in a busy area and the central logiemap position is set to "0", which means retain the orignional image since any artifacts will not be seen. If all the above tests are false, the central position of the logicmap is set to "128" and will be replaced by the dermging image.

logicmap=Table[0, {ynblocks}, {nblocks}];
For[i=2, i£ynblocks−1, i++,
   For[j=2, j£nblocks−1, j++,
      uniform=
         Round{
            Sum[varmap[[i+m, j+n]],
               {m, −1, 1}, {n, −1, 1}]];
      stdvar=
         Round [StandardDeviation[
            Flatten[
            Table[varmap[[i+m, j+n[[,
               {m, −1, 1}, {n, −1, 1}]/]];
      lefttest=
         Round}
            Sum[varmap[[i+m, j−1]],
               {m, −1, 1}]/3];
      righttest=
         Round[
            Sum[varmap[[i+m, j+1]],
               {m, −1, 1}]/3];
      toptest=
         Round{
            Sum[varmap[[i−1, j+n]],
               {n, −1, 1}]/3];
      bottointest=
         Round[
            Sum[varmap[[i+1, j+n]],
               {n, −1, 1}]/3];
      corner1=
         Round[
            (varmap[[i−1, j−1]]+
               varmap[[i, j−1]]+
               varmap[[i−1, j]])/3];
      corner2=
         Round[
            (varmap[[i+1, j−1]]+
               varmap[[i, j−1]]+
               varmap[[i+1, j]])/3];
      corner3=
         Round[
            (varmap[[i−1, j+1]]+
               varmap[[i−1, j]]+
               varmap[[i, j+1]])/3];
      corner4=
         Round[
            (varmap[[i+1, j+1]]+
               varmap[[i, j+1]]+
               varmap[[i+1, j]])/3];
      If[uniform £ thresh1,
         logicmap[[i, j]]=255,
         If[bottomtest £ thresh1 ∥
            lefttest £ thresh1 ∥
            righttest £ thresh1 ∥
            toptest £ thresh1 ∥
            corner1 £ thresh1 ∥
            corner1 £ thresh1 ∥
            corner1 £ thresh1 ∥
            corner1 £ thresh1 &&
               varmap[[i, j]]>thresh1,
         logicmap[[i, j]]=128,
         If[varmap[[i−1, j−1]]£
            thresh1 ∥
         varmap[[i−1, j]]£ thresh1 ∥
         varmap[[i−1, j+1]]£ thresh1 ∥

```
        varmap[[i, j−1]]£ thresh1 ||
        varmap[[i, j+1]]£ thresh1 ||
        varmap[[i+1, j−1]]£
            thresh1 ||
        varmap[[i+1, j]]£ thresh1 ||
        varmap[[i+1, j+1]]£
            thresh1 &&
        varmap[[i, j]]>thresh1,
        logicmap[[i, j]]=128,
            If[Abs[varmap[[i, j]]−uniform]£
                2*stdvar, logicmap[[i, j]]=0,
            logicmap[[i, j]]=128]]];]];
time3=TimeUsed[ ]
    5220.95
Print["maptime=", (time3−time2)/60]
    maptime=0.170278
    filterhistogram=
        Frequencies[Flatten[logicmap]]
    {{538, 0}, {2075, 128}, {2187, 255}}
    totalcounts=
        filterhistogram[[1, 1]]+
            filterhistogram[[2, 1]]+
            filterhistogram[[3, 1]]
    4800
    freqtest=
        N[filterhistogram[[1, 1]]/
            totalcounts]
    0.112083
```

FIG. 4 shows the resulting logicmap that will be used to form the final composite image.

```
    Show[Graphics[Raster[logicmap/255]],  AspectRatio
    Æ0.75];
```

Forming the Deblocking and Deringing Images

The next two steps use a convolution operation and the two filters defined above, the deringingfilter and the deblockingfilter, to form the smoothed images associated with deblocking and degriinging. The entire image is processed, but only those pixels defined by the logicmap will be used.

```
    ringingimage=
        Round[
            DiscreteConvolve[lumimage,
                deringingfilter,
                TransientSamples ÆTrue,
                Centered ÆTrue]/norm];
    blockimage=
        Round[
            DiscreteConvolve[lumimage,
                deblockingfilter,
                TransientSamples ÆTrue,
                Centered ÆTrue]/newnorm];
```

Here an output image is created to hold the composite image based on the logicmap.

```
    outputimage=Table[0, {d [[1]]),
        {d[[2]]}];
    time4=TimeUsed[ ]
    5246.27 Forming the Final Composite Image
```

This step simply references the logicmap and based on the value there, "255", "128", or "0", picks the corresponding image pixel from the deblocking image, the deringing image or the original image, respectively, and places it in the corresponding position in the output image. Note that since the logicmap has dimensions M/8×N/8, a Ceiling[] operation is used to map to the full M×N output array.

```
    For[i=1, i £ d[[1]], j++,
        For[j=1, j £ d[[2]], j++,
            Which[
                logicmap[[Ceiling[i/8],
                    Ceiling[j/8]]]ä 0,
                outputimage[[i, j]]=
                    lumimage[[i, j]],
                logicmap[[Ceiling[i/8],
                    Ceiling[j/8]]]ä 128,
                outputimage[[i, j]]=
                    ringingimage[[i, j]],
                logicmap[[Ceiling[i/8],
                    Ceiling[j/8]]]ä 255,
                outputimage[[i, j]]=
                    blockimage[[i, j]]];]];
    time5=TimeUsed[]
    5323.42
Print["create time=",
    (time5−time4) /60]
    create time=1.28583
```

The next few operations are not part of the JPEG artifact removal algorithm but is used to enhance the image with the type of kernel we will use in the final image processing pipeline. The size of the kernel is picked based on the size of the original image. Smaller images (640×480) need to be enhnaced at higher frequency (smaller kernel) since they have to be enlarged on the printer. The largest images (2000×1500) will require the full 7×7 kernel available in the PMI44i chip set since these image may have to be reduced to make a normal 6" by 4" print. The Which[] statement below picks the right kernel size, n, to use. The general rule is that on the image itself an enhancemnet MTF given by MTF(f)=1.0 +b(1-Sin[pnaf]/nSin[paf]) where n is the number of pixels used in forming the unsharp mask that is needed for the enhancement process, a is the size of a pixel, a=1/dpi, and f is the spatial frequency. b is the boost requested. Based on experiment and theory, the peak value for the MTF will take place when pnaf=4.5. For a 600 dpi printer, a=0.0423 mm. The value of f=3 c/mm will ensure that the boost is just where the eye MTf is falling of for normal viewing conditions. This give the result of n=11.28 or just for practical cases n=11. Hovever, this for the final print. The value of n needed for the data depends on the magnification. For a 640×480 file the magnification will be about 5 for a 600 dpi printer. This means n=11/5 is required. Again, for practical reason this means n=3 is needed to boost the image. The caluclations below take care of this automatically based on the printer dpi, the image pixel resolution and the final print size in inches.

Figure 5:
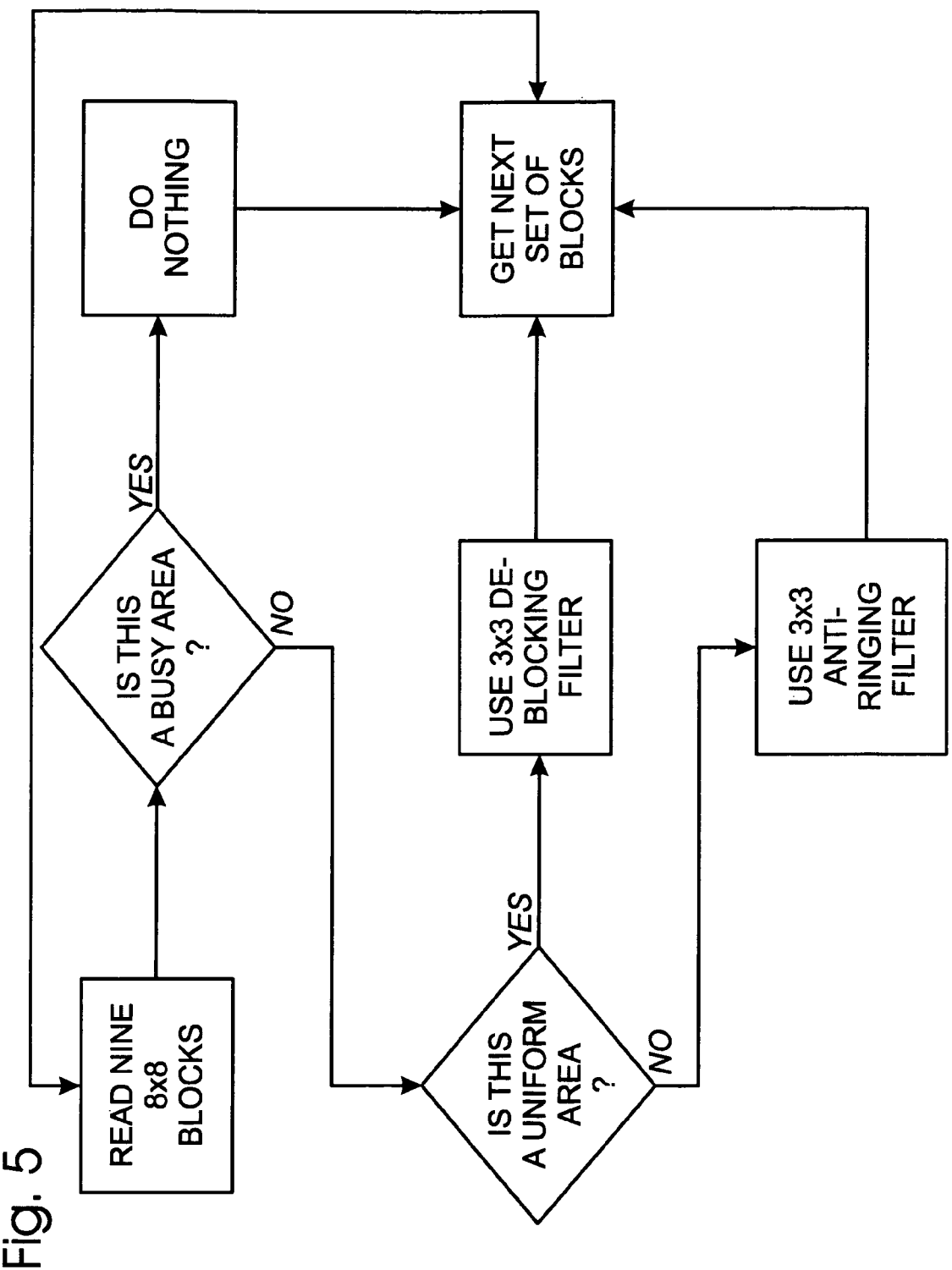

```
Dimensions[outputimage]
    {480, 640}
fpeak=3
    3
dpi=600
    600
pixelsize=25.4/dpi
    0.0423333
printsize=4
    4
mag=4/(1size/dpi)
    5
(*fpeak=If[freqtest£,25,1,3]*)
nx=N[4.5/(fpeak*pixelsize*pi)]
    11.2787
``` n=N[nx/mag]
  2.25574
n=Which[n £ 4, 3, n £ 6, 5, n>6, 7]
  3
mtf[b_, n_, pixelsize_, f_]:=
  1.0 ⇆
  b
    (1.0−Sin[Pi*pixelsize*n*f]/
      (n* Sin[Pi*pixelsize*f]));
Plot[mtf[b, nx, pixelsize, f], {f, 0, 10}];

FIG. 5 shows the MTF resoponse of the enhancement filter.

To form the enhancement filter we need to first form the one-dimensional equivalent. This is done by sampling the MTF curve at n-1 points and then taking the FFT of the symmetric array formed by the first MTF sample in the second position and replicas of the second MTF sample in the first and third elements of a three point array.This is done below. The two-dimensional filter is generated by the one-dimensional filter by simply forming a row and colum and multiplying them to get the 3×3 matrix. The filter is scaled by 512 to make it an integer calculation and then divided by 512 to get the correct answer.

amp=Table[mtf[b, nx, pixelsize, f],
  {f, 0.0001, 6, 12/(n+1)}]
  {1., 2.2231}
fir=FrequencySamplingFilter[n,
  amp, EvenSymetry ÆTrue]
  {−0.4077, 1.8154, 0.4077}
boostfilter=
  Round[512*Filter2D[fir]];
MatrixForm[N[boostfilter/512]]

$$\begin{pmatrix} 0.166016 & -0.740234 & 0.166016 \\ -0.740234 & 3.29492 & -0.740234 \\ 0.166016 & -0.740234 & 0.166016 \end{pmatrix}$$

newoutimage=
  Round[
    DiscreteConvolve [outputimage,
      boostfilter,
      TransientSamples ÆTrue,
      Centered ÆTrue]/512];
Dimensions[newoutimage]
  {480, 640}

Some of the operations below have been (* mmmmm *) to remove them from the calculation, but retain them for future diagnostic evaluation.
(*enhlum=
  Round[
    DiscreteConvolve[orig,
      boostfilter,
      TransientSamples→True,
      CenteredÆTrue]/512];*)
Dimensions[newoutimage]
  {480, 640}

The various output images are converted to graphics format so they can be written as tiff images. lumout is the fully processed Luminace channel and aimage and bimage are the unprocessed chorminance channels. enhlumout is the original luminace channel not processed for JPEG artifacts but enhanced by the unsharp mask kernel; this is useful for comparisons.

starttime 32 TimeUsed[]
  5332.47
(*eightout=
  Graphics[Raster[artifactmap/255],
    AspectRatioÆ1.0]*)
(*Export[
  "Macintosh HD:Desktop Folder:
    Blocking_Removal:eightout",
  eightout, "TIFF"]; *)
lumout=
  Graphics[Raster[newoutimage/255],
    AspectRatio Æ1.0];
(*enhlumout=
  Graphics[Raster[enhlum/255],
    AspectRatioÆ1.0]; *)
aimage=Graphics[Raster[aimage/255],
  AspectRatio Æ1.0];
bimage=Graphics[Raster[bimage/255],
  AspectRatio Æ1.0];
(*unenhimage=
  Graphics[Raster[outputimage/255],
    AspectRatio Æ1.0];*)
(*ringimage=
  Graphics[Raster[ringingimage/255],
    AspectRatioÆ1.0]; *)
(*block=Graphics[
  Raster[blockimage/255],
  AspectRatioÆ 1.0];*)

The next few operations write the tiff images.
Export[
  "Macintosh HD:Desktop Folder:
    Blocking_Removal:lum", lumout,
  "TIFF"];
(*Export[
  "Macintosh HD:Desktop Folder:
    Blocking_Removal:enhlum",
  enhlumout, "TIFF"]; *)
Export[
  "Macintosh HD:Desktop Folder:
    Blocking_Removal:a", aimage,
  "TIFF"];
Export[
  "Macintosh HD:Desktop Folder:
    Blocking_Removal:b", bimage,
  "TIFF"];
(*Export[
  "Macintosh HD:Desktop Folder:
    Blocking_Removal :unenhl",
  unenhimage, "TIFF"]; *)
(*Export[
  "Macintosh HD:Desktop Folder:
    Blocking_Removal:ring",
  ringimage, "TIFF"]; *)
(*Export[
  "Macintosh HD:Desktop Folder:
    Blocking_Removal :block",block,
  "TIFF"]; *)
writetime=(TimeUsed[]−starttime)/60
  0.665278
overalltime=
  (TimeUsed[]−firsttime)/60
  2.90194

5. The FIGS. 6, 7, and 8 Embodiment

Turning attention now to FIGS. 6–8, inclusive, these three figures serve to illustrate a modified form of the invention wherein all pixel blocks in the original i.mage are processed to completion for use in a final output image in a seriatim, pixel-block-by-pixel-block manner.

In FIG. 6, which shows an original whole image fragment 46, pictured therein is a single 8×8 pixel block 48 which is surrounded by additional pixels blocks 48a–48h, inclusive. It is with respect to pixel block 48, and to the just-identified eight surrounding pixel blocks that the second embodiment of the system and methodology of this invention is described now in conjunction with FIGS. 7 and 8.

Looking first of all now at FIG. 7, this figure fully diagrams practice of this modification of the invention. In FIG. 7, a block 50 represents a whole original image, block 52 represents structure and methodology for characterizing pixels as being uniform, transitional or busy, block 54 represents the structure and methodology for applying or not applying the de-blocking and de-ringing filters, and block 56 represents a final output image. Thus, what is shown in FIG. 7 is that a pixel in the original image, such as pixel 48, is examined, along with its surrounding pixel blocks, by block 52 to characterize it into one of the three pixel categories called uniform, transitional or busy. The characterized pixel is then supplied to block 54 which applies appropriate filtration, if any, in a de-blocking and de-ringing sense. Output from block 54, which is luminance-based, is combined with previously separated chrominance channels (not shown) to produce immediately a processed pixel, such as the one shown at 58, within final image 56.

FIG. 8 illustrates, fully and graphically, the modified artifact-removal algorithm which is implemented in FIG. 7. FIG. 8. Immediately following is a full description of the algorithm which implements the FIGS. 6, 7 and 8 embodiment of the present invention.

6. The FIGS. 6, 7 and 8 Artifact-Removal Algorithm
JPEG artifact removal program
$Line=1
1
<<Imageprocessing
<<Statistics
Read in the image file in raw, layered format and break it up into luminance and chrominance channels—square images.
image=ReadList["Macintosh HD; Desktop Folder:Blocking_Removal:garden.raw", Byte};
1=640*480
307200
The next three steps separate the luminance and chrominance channels.
lumimage=Take[image, 1];
aimage=Take[image, {1 +1, 2*1}];
bimage=Take[image, -1],
This calculates the size of the square image
size=640
640
A measure of the image "business" is obtained by calculating the Standard Deviation of the luminance channel. This is not currently used in the algorithm but is used for diagnositics.
imagestd=N[StandardDeviation[liminate]]
65.7788
The next three steps form square images.
liminage=Partition[liminage, size];
aimage=Partition[aimage, size];
bimage=Partition[bimage, size];
Dimensions [luminage]
(400, 640)

Orig is a copy of the luminance channel and will be used in the actuall processing.
orig=lumimage;
bs determines the block size used to get rid of the JPEG ringing and is normall set to8.
bs=8
8
The next step calulats the number of blocks on an edge that need to be looked at. The total number of blocks is nblocks*nblocks.
nblocks=size/bs
80
ynblocks=480/bs
60
stdarray=Table[0, [ynbiocks], {nblocks}];
The following threshold value is used to determine how to process the bs×bs block in question. Thresh1 determines the upper level of a uniform region (all threshold values are RMS values of the bs×bs blocks in the luminance channel). If the bs×bs block in question has any block around it (eight in all) that has a threshold lower or equal to thresh1, then the block in question needs to be tested for ringing artifacts. It the eight surrounding blocks have RMS values greater than thresh1 then it is assumed that the block in question is in the middle of a busy area and need not be processed further. In this implimentaUon the threshold values are RMS values of the bs×bs blocks. In the actual implementation one can use the Variance and save taking the squareroot.
thresh1=8;
Smallfilter is used to smooth the bs×bs block if it is is processed for artifact removal. The center weight tends to help blend the bs×bs block and the surrounding blocks. The area smoothed by the filter is actually a 10×10 array that includes the 8×8 JPEG block. After the smoothing takes place, only the 8×8 core is placed in the processed image. This prevents any errors in the convolution. From this point on the bs×bs block term will be repalce by 8×8 blocks since we will only be working on the 8×8 JPEG blocks.
smallfilter={{1, 3, 1}, {3, 6, 3}, {1, 3, 1}};
  norm=Sum[Flatten[smallfilter][[i]], {i, 1, 9}%9
Sum[Flatten(smallfilter][[i]], {i, 1, 9}]
  22
MatrixForm[smallfilter]

$$\begin{pmatrix} 1 & 3 & 1 \\ 3 & 6 & 3 \\ 1 & 3 & 1 \end{pmatrix}$$

smoothfilteer={{1, 1, 1}, {1, 5, 1}, {1, 1, 1}},
MatrixForm[smoothfilter]

$$\begin{pmatrix} 1 & 1 & 1 \\ 1 & 5 & 1 \\ 1 & 1 & 1 \end{pmatrix}$$

smoothnorm=13;
This helps me monitor the computation time using Mathematica.
t1=TimeUsed[]
15240.5 moveone is a counter.
    moveone=0;
    sigmabag is used to count the number of blocks processed and is used for diagnositics and has no impact on the actual processing.
    sigmabag=Table[0, {nblocks*ynblocks}];
outimage is used to overwrite the input by the results of the processing.
    outimage=lumimage;
pixelcount and calcount are counters.
    pixelcount=0;
    calcount=0;
This algorithm combines "ringing" atrifact removal and the "blocking" artifacts in one step. I have developed a two pass system that is more effective in removing the "blocking" artifacts and we can use it if we find this one pass algorithm not to meet our needs. The first step in the processing is to find the nine blocks that are required to make a decision. They form a 3 by 3 array of 8×8 blocks. b1 through b9 are the 8×8 blocks and std1 through std9 are the respective RMS values. The function Take[] just gets the respective 8×8 blocks. As the blocks are processed, only three new blocks need to be addressed, so the program keeps six values of b's and std's and renames them so they fit into the processing steps. At the start of each horizontal scan of the image, nine values are calculated, and for all other blocks on the horizontal sweep only three new values are calculated for each block processed. If a given block has any one of the eight surrounding blocks with an RMS value less than threshold thresh1 (RMS=8) then it is looked at for ringing artifacts. Two additional tests are made. The average of the RMS values of the blocks on top and bottom and the average of the RMS values to the left and right are calculated. If the RMS value of the block in question is greater than both of these RMS average values the block is smoothed by the 3×3 kernel. If not, the block is not processed and the algorithm moves to the next block and all the required average and RMS values are updated. If a block is smoothed by the 3×3 kernel., the smooth version is placed in the output image. The Replace [] function does this and the output image needs to be redefined in this version of the algorithm. There are several logical branches in this loop and the Goto[place] and Label[place] define those branches. If any given 8×8 block is not processed, the program just goes to the top of the loop.
    icount=0;
    jcount=0;
    skipitcount=0;
    boardercount=0;
    levelitcount=0;
    untext=0;
    difftable=Table[0, {nblocks+ynblocks}]
For[i=2, i<ynblocks, i++,
    icount+=1;
    For[J=2, j<nblocks, j++,
        jcount+=1;
        b1=Take[lumimage, {(i−2) *bs+1, (i−2) *bs+bs}, {(j−2) *bs+1, (j−2) *bs+bs}];
        b2=Take[lumimage, {(i−2) *bs+1, (i−2) *bs+bs}, {(j−1) *bs+1, (j−1) *bs+bs}];
        b3=Take[lumimage, {(i−2) *bs+1, (i−2) *bs+bs}, {(j) *bs+1, (j) *bs+bs}];
        b4=Take[lumimage, {(i−1) *bs+1, (i−1) *bs+bs}, {(j−2) *bs+1, (j−2) *bs+bs}];
        b5=Take[lumimage, {(i−1) *bs+1, (i−1) *bs+bs}, {(j−1) *bs+1, (j−1) *bs+bs}];
        b6=Take[lumimage, {(i−1) *bs+1, (i−1) *bs+bs}, {(j) *bs+1, (j) *bs+bs}];
        b7=Take[lumimage, {(i) *bs+1, (i) *bs+bs}, {(j−2) *bs+1, (j−2) *bs+bs}];
        b8=Take[lumimage, {(i) *bs+1, (i) *bs+bs}, {(j−1) *bs+1, (j−1) *bs+bs}];
        b9=Take[lumimage, {(i) *bs+1, (i) *bs+bs}, {(j) *bs+1, (j) *bs+bs}];
        std1=Round[StandardDeviation[Flatten[b1]]];
        std2=Round[StandardDeviation[Flatten[b2]]];
        std3=Round[StandardDeviation[Flatten[b3]]];
        std4=Round[StandardDeviation[Flatten[b4]]];
        std5=Round[StandardDeviation[Flatten[b4]]];
        std6=Round[StandardDeviation[Flatten[b6]]];
        std7=Round[StandardDeviation[Flatten[b7]]];
        std8=Round[StandardDeviation[Flatten[b8]]];
        std9=Round[StandardDeviation[Flatten[b9]]];
        avg1=Round[Mean[Flatten[b1]]];
        avg2=Round[Mean[Flatten[b2]]];
        avg3=Round[Mean[Flatten[b3]]];
        avg4=Round[Mean[Flatten[b4]]];
        avg5=Round[Mean[Flatten[b5]]];
        avg6=Round[Mean[Flatten[b6]]];
        avg7=Round[Mean[Flatten[b7]]];
        avg8=Round[Mean[Flatten[b8]]];
        avg9=Round[Mean[Flatten[b9]]];
        uniforintest=Round[(std1+std2+std3+std4+std6+std7+std8+std9)/8];
        If[uniformtest, thresh1, untest+=1];
        If[uniformtest <=thresh1, Goto[boarder], Goto[nextest]];
        Label[nextest];
        If[std1<=thresh1∥std2<=thresh1∥
            std3<=thresh1∥std4<=thresh1∥std6==thresh1
            ∥std7<=thresh1∥
            std8<=thresh1∥std9<=thresh1, Goto[compute], Goto [skipit]];
        Label [compute];
        fixit=1;
        moveone+=1;
        sigmabag[[moveone]]=std5;
        calcount+=1;
        region=
        Take[lumimage, {(i−1) *bs, (i−1) *bs+bs+1}, {(j−1) *bs, (j−1) *bs+bs+1}];
        smth=Round[DiscreteConvolve[region, smallfilter, TransientSamples ↑ False, OptionCentered ↑ True]/norm];
        Do[outimage=ReplacePart[outimage, smth[[m, n]], {(i−1) *bs+m, (j−1) *bs+n}],
        [m, 1, bs], [n, 1, bs]];
        stdarray[[i, j]]=128;
        If[fixitx1, Goto[skipit], Goto[boarder]];
        Label[boarder];
        boardercount+=1;
        uniform=0;
        uniformcount=0;
        uniform=uniform+If[std1, thresh1, avg1, 0];
        uniformcount=uniformcount+If[std1, thresh1, 1, 0];
        uniform=uniform+If[std2, thresh1, avg2, 0];
        uniformcount=uniformcount+If[std2, thresh1, 1, 0];
        uniform=uniform+If[std3, thresh1, avg3, 0];
        uniformcount=uniformcount+If[std3, thresh1, 1, 0];
        uniform=uniform+If[std4, thresh1, avg4, 0];
        uniformcount=uniformcount+If[std4, thresh1, 1, 0];
        uniform=uniform+If[std5, thresh1, avg5, 0];
        uniformcount=uniformcount+If[std5, thresh1, 1, 0];
        uniform=uniform+If[std6, thresh1, avg6, 0];

uniformcount=uniformcount+If[std6, thresh1, 1, 0],
uniform=uniform+If[std7, thresh1, avg7, 0];
uniformcount=uniformcount+If[std7, thresh1, 1, 0],
uniform=uniform+If[std8, thresh1, avg8, 0];
uniformcount=uniformcount+If[std8, thresh1, 1, 0],
uniform=uniform+If[std9, thresh1, avg9, 0];
uniformcount=uniformcount+If[std9, thresh1, 1, 0],
unifavg=Round[uniform/uniformcount];
diff=Round[avg5−unifavg];
difftable[[i*j]]=Abs[diff];
If[Abs[diff]≦thresh1, Goto[skipit], Goto[levelit]];
Label[levelit];
levelitcount+=1;
region=
  Take[lumimage, {(i−1) *bs, (i−1) *bs+bs+1}, {(j−1) *bs, (j−1) *bs+bs+1}];
smth=Round[DiscreteConvolve[region, smoothfilter,
  Transientsamples ↑ False, OptionCentered ↑ True]/
    smoothnorm];
Do[outimage=ReplacePart[outimage, smth[[m, n]], {(i− 1) *bs+m, (j−1) *bs+n}],
  {m, 1, bs), {n, 1, bs}];
stdarray[[i, j]]=255;
Label [skipit];
skipitcount+=1;
]; ];
Print["layer done", " ", "Time=",
  (TimeUsed[]−t1)/60, " ", "block hit =", calcount];
This just tells how long the processing took and the number of the blocks defined as busy, uniform or transitional and is just used for diagnoshes and is not part of the algorithm.
layer done Time=3.23722 block hit=1198
Print["icount=", icount, "jcount−", jcount, "untest=", untest];
icount=58 jcount=4524 untest313
Print["skipits=", skipitcount=boardercount=levelitcount−calcount,
  "boardercount", boardercount, "levelitcount=", levelitcount]
skipits=2721 boardercount313 levelitcount=292

Accordingly, a novel system and methodology is provided by the present invention for dealing with JPEG-compressed artifacts of the usual blocking and ringing types. The invention begins with a first stage investigation (see FIG. 1) regarding whether a selected original color image is a suitable candidate for artifact removal, and if so, triggers the invocation of one of the two forms of artifact removal described above. Original image pixels, and more specifically, the luminance-channel components of those images, are examined to characterize them as being either busy, uniform or transitional, with this information then being employed to create correspondingly positioned output pixels for incorporation in a final image. While several modifications of the system and methodology of the invention have been illustrated and described herein, it is appreciated that variation and modification may be may without departing from the spirit of the invention.

I claim:

1. A computer-based method relating to artifact removal with regard to a selected, data-compressed, original printable image comprising
  determining the file size of the original image,
  comparing the determined file size to a selected file-size threshold value, and
  if, but only if, the determined file size is equal to or smaller that the selected threshold value, characterizing the original image as a candidate for artifact removal.

2. The method of claim 1 which further includes, following characterization of the image as a candidate for artifact removal, implementing artifact removal.

3. A computer-based method relating to artifact removal with regard to a selected, data-compressed, original printable image comprising
  determining the file size of the original image,
  determining the pixel count of that image,
  generating the mathematical product of the determined file size multiplied by the determined pixel count to produce a file-size pixel-count multiplication product,
  comparing the produced multiplication product to a selected threshold value, and
  if, but only if, the produced multiplication product is equal to or smaller than the selected threshold value, implementing artifact removal.

4. The method of claim 3, wherein artifact removal comprises separating the original image into one luminance and two chrominance channels, and filtering the luminance channel with two low-pass filter kernals including (a) a deringing kernal to create and store an overall de-ringing luminance image, and (b) a de-blocking kernal to create and store an overall de-blocking luminance image,
  separating the luminance channel into selected plural-pixel blocks, or regions, and creating therefrom two arrays/maps including (a) a pixel-block variance map, and (b), from the variance information developed in the variance map, a one-for-one pixel-block logic map wherein pixel blocks are characterized individually, and mutually exclusively, as being (a) busy, (b) transitional, or (c) uniform,
  utilizing pixel-block by pixel-block information thus created in the logic map as a guide, selecting related pixel blocks exclusively from one of (a) the original luminance image, (b) the de-ringing luminance image, (c) and the de-blocking luminance image to create a processed luminance image,
  applying luminance enhancement to the processed luminance image in accordance with the pixel-block information contained in the variance map to produce an enhanced processed luminance image, and
  combining the enhanced processed luminance image with the previously separated two chrominance channels to produce an artifact-processed printable whole output image.

5. A computer-based, non-computer-platform specific processing method for removing and/or reducing visible artifacts in a selected, data-compressed original, printable color image comprising,
  reviewing the original image in relation to selected image criteria to determine whether or not artifact processing is to be implemented, and if the answer is yes
  separating the image into one luminance and two chrominance channels, and filtering the luminance channel with two low-pass filter kernals including (a) a deringing kernal to create and store an overall deringing luminance image, and (b) a deblocking kernal to create and store an overall deblocking luminance image,
  separating the luminance channel into selected plural-pixel blocks, or regions, and creating therefrom two arrays/maps including (a) a pixel-block variance map, and (b), from the variance information developed in the variance map, a one-for-one pixel-block logic map wherein pixel blocks are characterized indivdually, and mutually exclusively, as being (a) busy, (b) transitional, or (c) uniform, utilizing pixel-block by pixel-block information thus created in the logic map as a guide, selecting related pixel blocks exclusively from one of (a) the original luminance image, (b) the deringing luminance image, (c) and the deblocking luminance image to create a processed luminance image, applying luminance enhancement to the processed luminance image in accordance with pixel-block information contained in the variance map to produce an enhanced processed luminance image, and combining the enhanced processed luminance image with the previously separated two chrominance channels to produce an artifact-processed printable whole output image.

6. A computer-based method regarding artifact removal in relation to a selected, data-compressed, original printable image comprising making an initial assessment regarding whether or not to invoke artifact removal, where such assessment is based upon the calculation F×P/M=θ, where F is the original-image file size in K-bytes, P is the original image pixel count in K-pixels, M is a user-defined magnification to employ during printing, and θ is a defined threshold value, and invoking artifact removal, where F×P/M<=θ.

7. The method of claim 6, wherein invocation of artifact removal involves examining successive, selected pixel regions for certain general, mutually exclusive characteristics selected from the group including (a) uniformity/homogeneity, (b) regional transitional qualities where adjacent pixel regions per se are differentiated broadly by significantly differing pixel characteristics, and (c) high-level, internal variation.

8. The method of claim 7, wherein selection of regions for examination involves reviewing selected neighborhood clusters of adjacent regions.

9. A method for evaluating a computer-based, data-compressed printable image for the invocation of artifact removal (AR) comprising calculating an index number I employing as operands, image file size (F) total pixel count (P) and desired final printed image magnification (M), comparing I to an AR-invocation trigger value θ, and invoking AR under circumstances where I bears a certain relationship to θ.

10. The method of claim 9, wherein calculation of I involves the calculation of a ratio involving F, P and M.

11. The method of claim 10, wherein the ratio is F×P/M.

12. The method of claim 11, wherein I=F×P/M.

13. The method of claim 12, wherein the certain relationship mentioned is I<=θ.

* * * * *